(12) United States Patent
Liang et al.

(10) Patent No.: US 11,684,845 B2
(45) Date of Patent: Jun. 27, 2023

(54) GAMING SYSTEM AND GAMING TABLE

(71) Applicants: Che-Wei Liang, Taipei (TW);
Kun-Hsuan Chang, Taipei (TW);
Yu-Hao Tseng, Taipei (TW);
Jung-Ming Hung, Taipei (TW);
Sheng-Chieh Tang, Taipei (TW)

(72) Inventors: Che-Wei Liang, Taipei (TW);
Kun-Hsuan Chang, Taipei (TW);
Yu-Hao Tseng, Taipei (TW);
Jung-Ming Hung, Taipei (TW);
Sheng-Chieh Tang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 367 days.

(21) Appl. No.: 16/594,069

(22) Filed: Oct. 6, 2019

(65) Prior Publication Data
US 2020/0282305 A1 Sep. 10, 2020

(30) Foreign Application Priority Data
Mar. 5, 2019 (TW) ................................ 108107235

(51) Int. Cl.
*A63F 13/213* (2014.01)
*A63F 13/2145* (2014.01)
*A63F 13/235* (2014.01)
*A63F 1/06* (2006.01)
*A63F 1/02* (2006.01)
(Continued)

(52) U.S. Cl.
CPC ............ *A63F 13/213* (2014.09); *A63F 1/067* (2013.01); *A63F 13/2145* (2014.09); *A63F 13/235* (2014.09); *A63F 1/02* (2013.01); *A63F 9/20* (2013.01); *A63F 13/80* (2014.09); *A63F 2001/008* (2013.01); *A63F 2001/0475* (2013.01); *A63F 2009/205* (2013.01); *A63F 2009/2435* (2013.01); *A63F 2300/1031* (2013.01); *A63F 2300/1075* (2013.01); *A63F 2300/1087* (2013.01); *A63F 2300/80* (2013.01)

(58) Field of Classification Search
CPC .................... A63F 13/213; A63F 13/80; A63F 2001/0475; A63F 2009/2435; A63F 2300/1087; A63F 2300/80
See application file for complete search history.

(56) References Cited

U.S. PATENT DOCUMENTS 5,722,893 A * 3/1998 Hill ........................... A63F 1/14
273/149 R
6,579,181 B2 * 6/2003 Soltys ................. G07F 17/3241
463/25

(Continued)

*Primary Examiner* — William H McCulloch, Jr.
(74) *Attorney, Agent, or Firm* — JCIPRNET

(57) ABSTRACT

A gaming system for card games is provided. The gaming system includes a plurality of gaming cards and a processor. Each of the gaming cards has a recognition code. The processor is configured to: generate a correspondence between the recognition codes of the gaming cards and a plurality of card faces; obtain an image of the gaming card placed in a recognition area captured by an image capturing device; recognize the recognition code in the image to generate game data according to a recognition result and the correspondence; and generate a game screen to be displayed by a display according to the game data. In addition, a gaming table is also provided.

33 Claims, 7 Drawing Sheets

(51) Int. Cl.
  *A63F 9/20*   (2006.01)
  *A63F 1/00*   (2006.01)
  *A63F 13/80*  (2014.01)
  *A63F 1/04*   (2006.01)
  *A63F 9/24*   (2006.01)

(56) References Cited

U.S. PATENT DOCUMENTS

| | | | | |
|---|---|---|---|---|
| 7,946,491 B2* | 5/2011 | Burian | ............... | G06K 7/10722 235/462.07 |
| 8,419,535 B2* | 4/2013 | Miller | ............... | A63F 1/12 463/31 |
| 8,545,328 B2* | 10/2013 | Miller | ............... | G07F 17/3293 463/42 |
| 8,556,266 B2* | 10/2013 | Yoshida | ............... | A63F 1/02 273/293 |
| 8,758,111 B2* | 6/2014 | Lutnick | ............... | G07F 17/322 463/16 |
| 8,932,124 B2* | 1/2015 | Lutnick | ............... | G07F 17/3244 463/16 |
| 9,254,435 B2* | 2/2016 | Miller | ............... | A63F 1/14 |
| 9,595,169 B2* | 3/2017 | Lutnick | ............... | G07F 17/3276 |
| 9,886,766 B2* | 2/2018 | Madineni | ............... | G06T 7/11 |
| 10,551,967 B2* | 2/2020 | Ha | ............... | G06F 3/044 |
| 11,247,122 B2* | 2/2022 | Tseng | ............... | A63F 13/213 |
| 2008/0029602 A1* | 2/2008 | Burian | ............... | G06K 7/10722 235/462.09 |
| 2010/0276887 A1* | 11/2010 | Yoshida | ............... | A63F 1/02 273/293 |
| 2010/0311489 A1* | 12/2010 | Miller | ............... | G07F 17/32 463/16 |
| 2010/0311490 A1* | 12/2010 | Miller | ............... | A63F 1/18 463/16 |
| 2011/0049234 A1* | 3/2011 | Yoshida | ............... | G06F 3/0421 235/380 |
| 2015/0049946 A1* | 2/2015 | Madineni | ............... | G06T 7/11 382/173 |
| 2016/0045816 A1* | 2/2016 | Ogilvie | ............... | A63F 1/02 273/295 |
| 2019/0278457 A1* | 9/2019 | Ha | ............... | G06K 19/0672 |
| 2019/0366197 A1* | 12/2019 | Buzza | ............... | A63F 1/18 |
| 2020/0282304 A1* | 9/2020 | Tseng | ............... | G06K 9/3233 |
| 2020/0282305 A1* | 9/2020 | Liang | ............... | A63F 13/213 |

* cited by examiner

GAMING SYSTEM AND GAMING TABLE

CROSS-REFERENCE TO RELATED APPLICATION

This application claims the priority benefit of Taiwan application serial no. 108107235, filed on Mar. 5, 2019. The entirety of the above-mentioned patent application is hereby incorporated by reference herein and made a part of this specification.

BACKGROUND

1. Field of the Invention

The invention relates to a gaming system, and more particularly, to a gaming system and a gaming table for card games.

2. Description of Related Art

A typical card game can usually be played with multiple players, but it is not easy to gather multiple players for the card game in a modern busy life. For example, a mahjong game can be played only with four players sitting around the same mahjong table, but there is often a "three players yet missing one" situation since in many cases it is not easy to gather four players.

With the development of science and technology, many online card games have been developed. By gathering and matching players via the Internet, these online card games can meet the needs of playing games anytime and anywhere. However, although the game may be played anytime and anywhere through the online games, the user can only operate virtual cards through a touch screen or a mouse in lack of interactions with physical cards such as drawing, discarding, etc.

SUMMARY OF THE INVENTION

A gaming system in an embodiment of the invention includes a plurality of gaming cards and a processor. Each of the gaming cards has a recognition code. The processor is configured to: generate a correspondence between the recognition codes of the gaming cards and a plurality of card faces; obtain an image of the gaming card placed in a recognition area; recognize the recognition code in the image to generate game data according to a recognition result and the correspondence; and generate the game screen according to the game data.

A gaming table in an embodiment includes a display, an invisible light source, an image capturing device and a processor. The display includes a recognition area, and is configured to display a first game screen. The invisible light source is configured to emit an invisible light towards the recognition area. The image capturing device is configured to capture a recognition code image of the gaming card formed by a reflected light of the invisible light. The processor is coupled to the display, the invisible light source and the image capturing device, and configured to: generate a correspondence between a plurality of recognition codes and a plurality of card faces; recognize the recognition code image, and obtain a recognition result; generate first game data according to the recognition result and the correspondence; and generate the first game screen according to the first game data.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
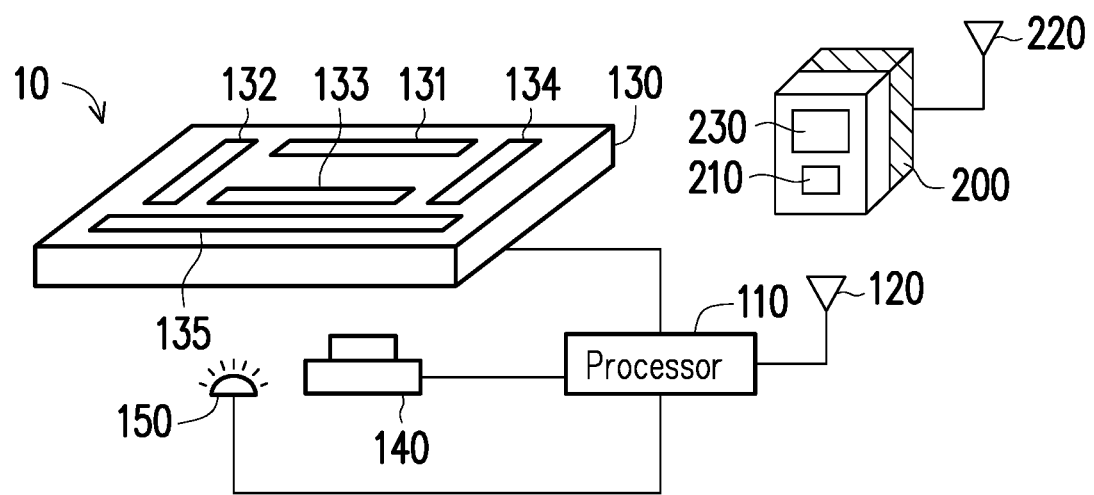
FIG. 1 illustrates a schematic diagram of a gaming system in an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The gaming system proposed by the embodiments of the invention is applicable to playing cards, mahjong tiles or other card games for one to many people. Nonetheless, the following embodiments are exemplified with mahjong tiles played by one person, but the invention is not limited thereto. It is worth noting that, herein, the term "user" refers to the person who uses the gaming system, and the term "players" refers to other players who participating in a card game with the user. Therefore, for the user, the term "players" refers to virtual characters.

FIG. 1 illustrates a schematic diagram of a gaming system in an embodiment of the invention. With reference to FIG. 1, a gaming system 10 can be used for playing card games.

In some embodiments, the gaming system 10 includes a processor 110, a first communication module 120, a display 130, an image capturing device 140, an invisible light source 150 and a plurality of gaming cards 200 (only one gaming card 200 is illustrated in FIG. 1). Among them, the processor 110 is coupled to the first communication module 120, the display 130, the image capturing device 140 and the invisible light source 150. For instance, the processor 110, the first communication module 120, the display 130, the image capturing device 140 and the invisible light source 150 may be integrated as a gaming table (e.g., a mahjong table) so the user can treat the display 130 as a gaming environment (e.g., a mahjong table top) and perform a game operation (e.g., shuffling, building, drawing or playing) for the cards in the card game on the display 130. Accordingly, the display 130 can display a game screen (e.g., a game animation, a game option, cards discarded by other players or a dialog) according to a current game status.

The processor 110 is configured to run program codes required by the card game, perform various determinations and calculations in the game, generate various game data, control signals required by the game, etc. The processor 110 may be a central processing unit (CPU) with dual-core, quad-core or eight-core, a system-on-chip (SOC), an application processor, a media processor, a microprocessor, a digital signal processor, a programmable logic device, an application specific integrated circuit (ASIC), a programmable logic device (PLD), other similar devices or a combination of the above devices, which are not particularly limited by the invention.

In some embodiments, the processor 110 will generate the game data. In detail, the game data includes any data related to the game, such as cards drawn or discarded by the user, a game flow, winning, losing and scoring of the game, but the invention is not limited thereto.

The first communication module 120 is configured to assist the processor 110 in communicating with devices other than processor 110. The first communication module 120 may include, for example, a wired Ethernet module, wireless modules like a 3G module, a 4G module, a Bluetooth module, a Wi-Fi module, a LoRa module, a SIGFOX module, an NB-IoT module, or modules using other communication technologies or a combination of the above modules, which are not particularly limited by the invention.

In some embodiments, when another player simultaneously uses another gaming system similar to the gaming system 10 to play a multiplayer online game with the user of the gaming system 10, the first communication module 120 can receive the game data from said another gaming system and send the game data to said another gaming system. In this way, the processor 110 can generate a game screen according to the received game data during the multiplayer online game. For instance, when said another player plays or discards the card, the game screen can display the card played or discarded by said another player. When the user plays or discards the card, the processor 110 may also accordingly generate the game data and send the generated game data to said another gaming system so said another gaming system can display the card played or discarded by the user.

In some embodiments, the processor 110 can directly or indirectly send the data to the gaming cards 200 through the first communication module 120. For instance, the first communication module 120 may be directly connected to the gaming cards 200 in a wired manner, and the processor 110 may respectively specify the data to be sent to which one of the gaming cards. As another example, the gaming cards 200 may include one root gaming card and a plurality of end gaming cards, and a wireless transmission may be performed between the root gaming card and the end gaming cards The root gaming cards is responsible for wirelessly connecting with the first communication module 120 to obtain the data from the first communication module 120 so the root gaming card can then directly or indirectly send the data to the specified end gaming card.

The display 130 is configured to display the game screen. Here, the game screen displays all the information like animations, images or texts to be viewed by the player. Persons with ordinary skill in the art can design the game screen based on actual requirements, and thus the game screen is not further exemplified hereinafter. The display 130 may be various display screens like a liquid-crystal display (LCD), a light-emitting diode (LED) or an organic light-emitting diode (OLED), which are not particularly limited by the invention.

In some embodiments, the display 130 includes recognition areas 131 to 135. Specifically, the recognition areas 131 to 135 are areas that the gaming cards 200 can be recognized when being placed therein. For example, the recognition areas 131 to 135 may be directly labeled with stickers, printed on the display 130 or displayed by the display 130, and the invention is not limited thereto. For instance, the recognition areas 131 to 134 are for placing a card pile for the user to draw cards, and the recognition area 135 is used for placing the cards in the hand of the user.

In some embodiments, the display 130 includes a touch element (not illustrated), and the touch element may be integrated with the display 130 to form a touch display. Here, the display 130 displays the game screen, and the touch element is configured to receive an external program touch command. For instance, the user of the gaming system 10 can provide an external program touch command through the touch element in order to perform program related operations like "dicing", "friend invitation", "friend confirmation", "ending the game" or "playing again".

In some embodiments, the gaming system 10 further includes a sound-receiver element (not illustrated), such as a microphone. For example, the sound-receiver element is coupled to the processor 110 and integrated with the gaming table that includes the processor 110, the first communication module 120, the display 130, the image capturing device 140 and the invisible light source 150. The user of the gaming system 10 can provide a game operation voice command through the sound-receiver element to perform the game operation like "Chow", "Pong", "Kong", or "Winning". Nonetheless, the implementations of the game operation are not particularly limited by the invention. In other embodiments, the gaming operations may also be determined automatically by, for example, the processor 110 (e.g., which are determined according to a game rule and a recognition code image of the gaming card captured by the image capturing device).

The image capturing device 140 is configured to obtain an image of the gaming card 200 placed in the recognition areas 131 to 135 of the display 130 through the display 130. In particular, the image capturing device 140 has the ability to capture a recognition code 210 of the gaming card 200. In some embodiments, the recognition code 210 of the gaming card 200 is printed by using an invisible ink (e.g., an infrared ink). In this case, the invisible light source 150 can emit an invisible light (e.g., an infrared light) towards the recognition areas 131 to 135 so the image capturing device 140 can capture a reflected light of the invisible light reflected by the gaming card 200 to obtain the image of the gaming card 200 that includes the recognition code image of the recognition code 210. In this way, the user cannot see the recognition code 210 of the gaming card 200 during the game while the image capturing device 140 can capture the recognition code 210 of the gaming card 200.

The gaming card 200 includes the recognition code 210, a second communication module 220 and a display panel 230, and the recognition codes 210 on the gaming cards 200 are different from each other. Specifically, the gaming card 200 is printed with the recognition code 210 without a card face. The processor 110 can generate a correspondence between the recognition codes of the gaming cards 200 and a plurality of card faces, and send the card faces to the corresponding gaming cards 200 according to the correspondence through the first communication module 120. Then, after receiving the card face through the second communication module 220, the gaming card 200 can display the card face through the display panel 230. For instance, at a shuffling stage before a first-round game starts, the processor 110 can randomly generate the card faces corresponding to the recognition codes 210, obtain a first correspondence between the recognition codes 210 and the card faces, and record the first correspondence for the first-round game. At the shuffling stage before the next-round game or a second-round game starts, the processor 110 can randomly generate the card faces corresponding to the recognition codes 210, obtain a second correspondence between the recognition codes 210 and the card faces, and record the second correspondence for the second-round game. The first correspondence is different from the second correspondence, that is, the card face corresponding to the gaming card 200 with the same recognition code 210 will be changed in each round of the game.

Figure 2:
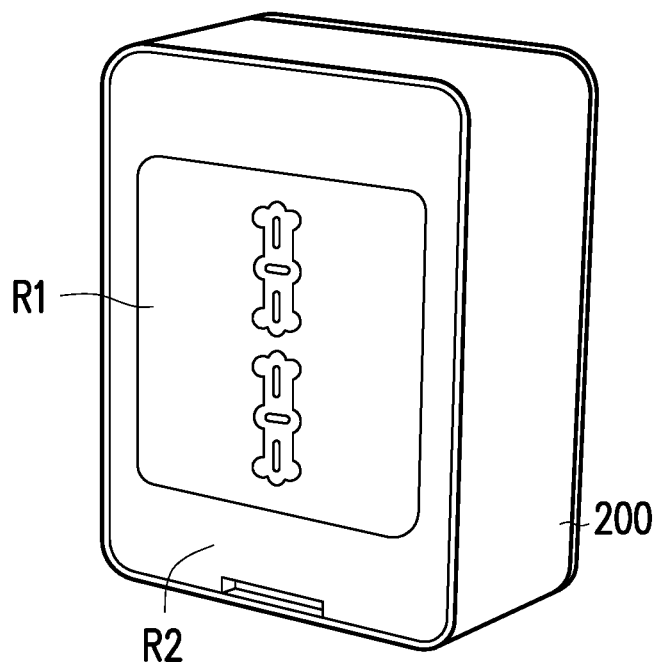
FIG. 2 illustrates a schematic diagram of an external appearance of a gaming card in an embodiment of the invention.

The gaming card 200 will be further described below with reference to FIG. 2 to FIG. 7B. FIG. 2 illustrates a schematic diagram of an external appearance of a gaming card in an embodiment of the invention.

With reference to FIG. 2, in some embodiments, the gaming card 200 is implemented as, for example, an appearance of the mahjong tile, and one of surfaces (e.g., a front surface) of the gaming card 200 includes a first area R1 (e.g., a center area) and a second area R2 (e.g., a peripheral area surrounding the center area). The display panel 230 corresponds to the first area R1, and the recognition code 210 corresponds to the second area R2. Further, the first area R1 does not overlap with the second area R2, that is, the recognition code 210 and the display panel 230 of the gaming card 200 are not shielded from each other.

Figure 3:
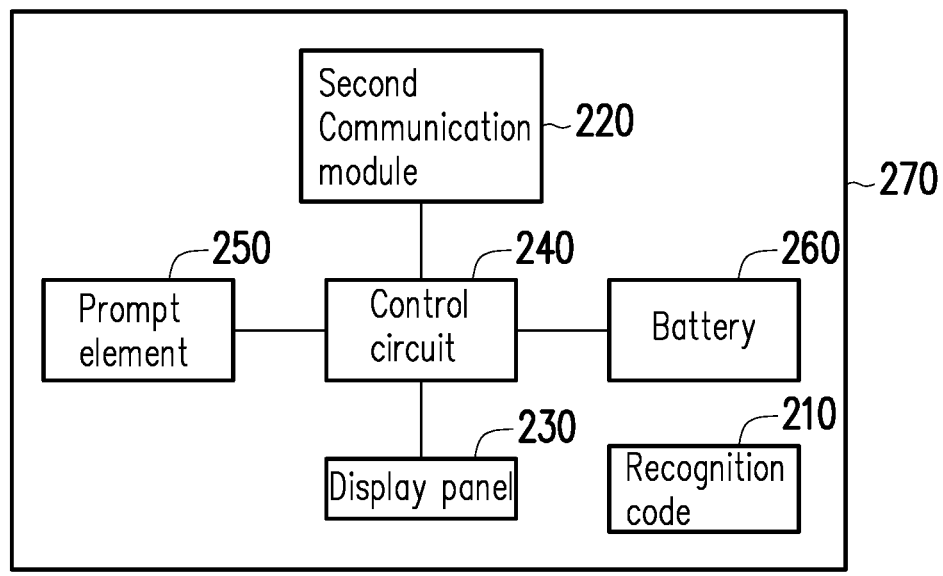
FIG. 3 illustrates a block diagram of a gaming card in an embodiment of the invention.

FIG. 3 illustrates a block diagram of a gaming card in an embodiment of the invention.

With reference to FIG. 3, in some embodiments, the gaming card 200 includes the recognition code 210, the second communication module 220, the display panel 230, a control circuit 240, a prompt element 250, a battery 260 and an outer casing 270. Among them, the second communication module 220, the display panel 230, the prompt element 250 and the battery 260 are coupled to the control circuit 240; the battery 260 is configured to provide power required by each element in the gaming card 200; the outer casing 270 is printed with the recognition code 210 and configured to accommodate the second communication module 220, the display panel 230, the control circuit 240, the prompt element 250 and the battery 260.

The recognition code 210 is, for example, a one-dimensional barcode, a quick response code (QR Code), or other types of codes. The invention is not limited in this regard, and persons with ordinary skill in the art can design the recognition code 210 based on actual requirements. In some embodiments, the recognition code 210 is invisible under a visible light. For instance, the recognition code 210 may be printed on the outer casing 270 by using the invisible ink.

The second communication module 220 is wirelessly coupled to the first communication module 210 and thereby wirelessly coupled to the processor 110. In some embodiments, the second communication module 220 is configured to receive information of the card face and the control signal from the processor 110, but the invention is not limited thereto. The second communication module 220 is, for example, the 3G module, the 4G module, the Bluetooth module, the Wi-Fi module, the LoRa module, the SIGFOX module, the NB-IoT module, or modules using other wireless communication technologies or a combination of the above modules, which are not particularly limited by the invention.

The display panel 230 is configured to display the card face, and is, for example, an electronic paper or a display screen like the liquid-crystal display (LCD), the light-emitting diode (LED) or the organic light-emitting diode (OLED). The invention is not limited in this regard. For instance, if the gaming system 10 runs the poker game, the display panel 230 may display the card face containing the suit (e.g., spade, heart, diamond and club) and the number (e.g., A, 1, 2, . . . , K); if the gaming system 10 runs a mahjong game, the display panel 230 may display the card face containing the mahjong suit (as shown by FIG. 2).

The control circuit 240 is responsible for the overall operation of the gaming card 200. The control circuit 240 may be the central processing unit (CPU) with dual-core, quad-core or eight-core, the system-on-chip (SOC), the application processor, the media processor, the microprocessor, the digital signal processor, the programmable logic device, the application specific integrated circuit (ASIC), the programmable logic device (PLD), other similar devices or a combination of the above devices, which are not particularly limited by the invention. In some embodiments, when receiving the card face of the gaming card 200 through the second communication module 220, the control circuit 240 uses the display panel 230 to display the received card face.

The prompt element 250 is configured to send a prompt signal. In some embodiments, the prompt element 250 is a light-emitting prompt element like an LED light, which is used to send different prompt signals by bright, dark or flashing state of the LED light. In other embodiments, the prompt element 250 may also be, for example, a speaker or other types of elements for sending the prompt signal through sounds or other forms, but the invention is not limited thereto.

In some embodiments, the processor 110 sends the control signal to one of the gaming cards 200 (a.k.a. a concerned gaming card 200) according to the game data through the first communication module 120 so the gaming card 200 that receives the control signal through the second communication module 220 can send the prompt signal according to the control signal. For instance, when it is the turn of the user to draw the card from the card pile, the processor 110 can send the control signal to the gaming card 200 (e.g., the concerned gaming card 200) that should be drawn by the user according to the game data (e.g., the game rule), and the LED light in the concerned gaming card 200 will flash according to the control signal so as to prompt the user to draw the concerned gaming card 200 that flashes.

The battery 260 is configured to provide power required by the gaming card 200. The battery 260 may be a chargeable lithium battery, but the invention is not limited thereto.

Figure 4:
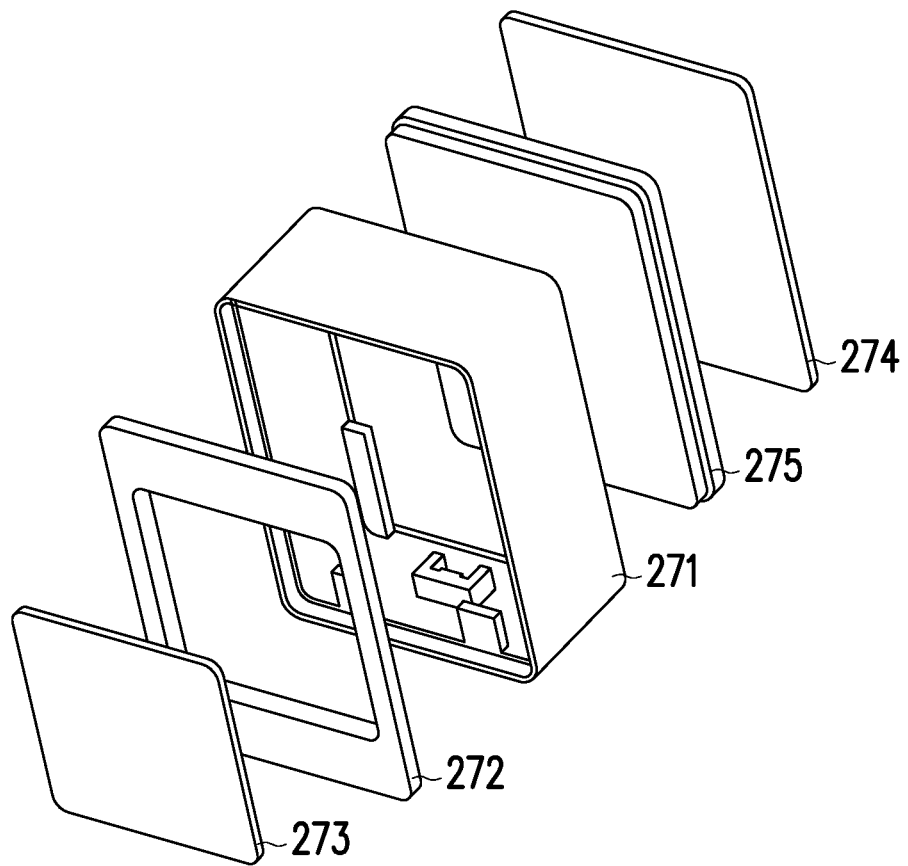
FIG. 4 illustrates an explosion diagram of an outer casing of a gaming card in an embodiment of the invention.

FIG. 4 illustrates an explosion diagram of an outer casing of a gaming card in an embodiment of the invention.

With reference to FIG. 4, in some embodiments, the outer casing 270 is composed of a lateral shell 271, a front surface layer 272, a transparent window 273, a back surface layer 274 and a light guiding layer 275. As shown by FIG. 4, the front surface layer 272 and the transparent window 273 cover one side of the lateral shell 271, and the light guiding layer 275 and the back surface layer 274 sequentially covers another side of the lateral shell 271, so as to form an accommodating space of the outer casing 270.

Figure 5A:
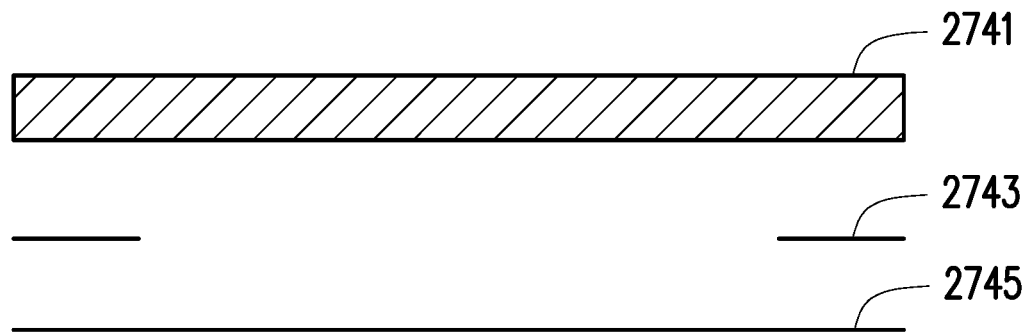
FIG. 5A illustrates a schematic diagram of a back surface layer in an embodiment of the invention.
Figure 5B:
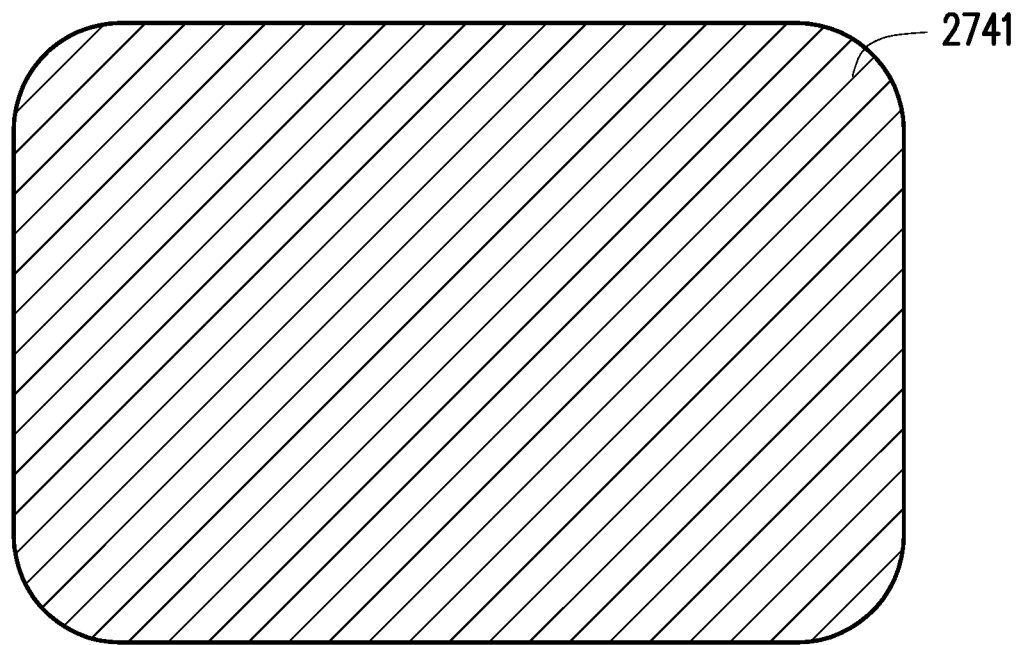
FIG. 5B illustrates a schematic diagram of a first transparent dark color based layer in an embodiment of the invention.

FIG. 5A illustrates a schematic diagram of a back surface layer in an embodiment of the invention; FIG. 5B illustrates a schematic diagram of a first transparent dark color based layer in an embodiment of the invention.

With reference to FIG. 5A, in a sequence from the outside of the gaming card 200, the back surface layer 274 includes a first transparent dark color based layer 2741, a first recognition code layer 2743 and a first shielding layer 2745. With reference to FIG. 5B, the first transparent dark color based layer 2741 does not include a hollow area. In some embodiments, the first transparent dark color based layer 2741 is made of, for example, a transparent black acrylic. At a position corresponding to the second area R2, the first recognition code layer 2743 includes the recognition code 210, which is printed between the first transparent dark color based layer 2741 and the front surface layer 272. The first shielding layer 2745 is configured to shield the invisible light emitted by the invisible light source 150 to prevent a recognition accuracy from being reduced by the invisible light penetrated into the gaming card 200.

Figure 6A:
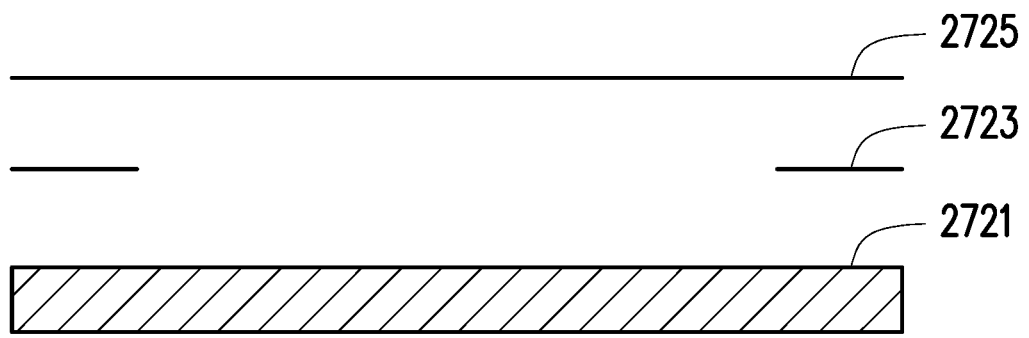
FIG. 6A illustrates a schematic diagram of a front surface layer in an embodiment of the invention.
Figure 6B:
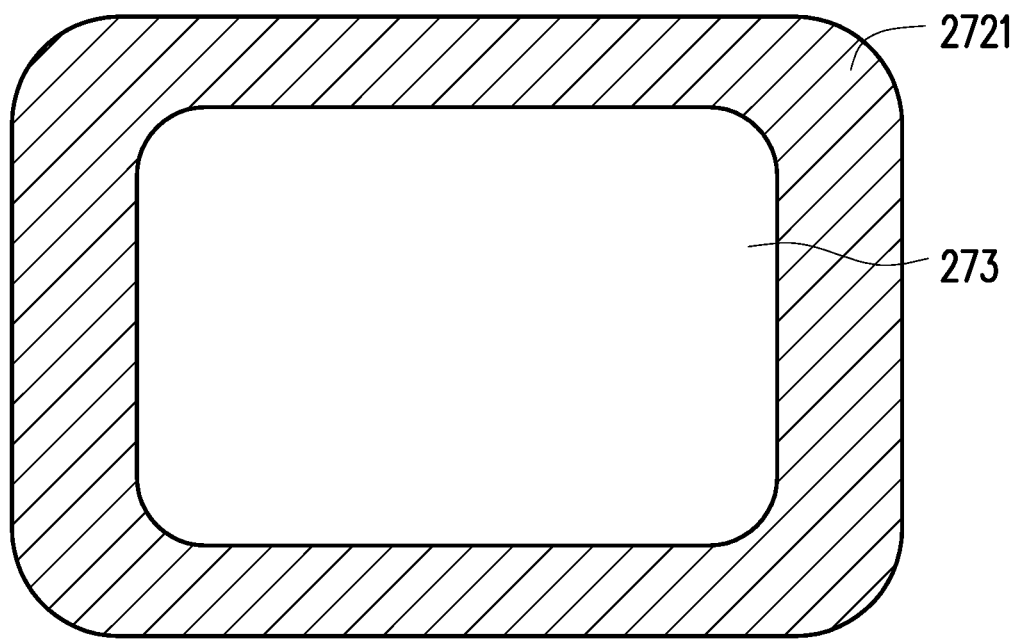
FIG. 6B illustrates a schematic diagram of a second transparent dark color based layer in an embodiment of the invention.

FIG. 6A illustrates a schematic diagram illustrating a front surface layer in an embodiment of the invention; FIG. 6B illustrates a schematic diagram of a second transparent dark color based layer in an embodiment of the invention.

With reference to FIG. 6A, in a sequence from the outside of the gaming card 200, the front surface layer 272 includes a second transparent dark color based layer 2721, a second recognition code layer 2723 and a second shielding layer 2725. With reference to FIG. 6B, at position corresponding to the first area R1, the second transparent dark color based layer 2721 includes the hollow area, and the transparent window 273 is disposed on the hollow area. In some embodiments, the second transparent dark color based layer 2721 is made of, for example, a transparent black acrylic. At a position corresponding to the second area R2, the second recognition code layer 2723 includes the recognition code 210, which is printed between the second transparent dark color based layer 2721 and the back surface layer 274. The second shielding layer 2725 is configured to shield the invisible light emitted by the invisible light source 150 to prevent the recognition accuracy from being reduced by the invisible light penetrated into the gaming card 200.

When the display panel 230 is disposed in the accommodating space of the outer casing 270 at a position corresponding to the transparent window 273, the content displayed by the display panel 230 may be viewed from the outside of the gaming card 200, the recognition code 210 and the display panel 230 do not shield each other, and the transparent window 273 can prevent the display panel 230 from being scratched.

With reference to FIG. 4, the light guiding layer 275 is disposed between the lateral shell 271 and the back surface layer 274, and configured to guide the prompt signal emitted by the prompt element 250 to the outside of the outer casing 270 when the prompt element 250 is disposed in the outer casing 270.

Figure 7A:
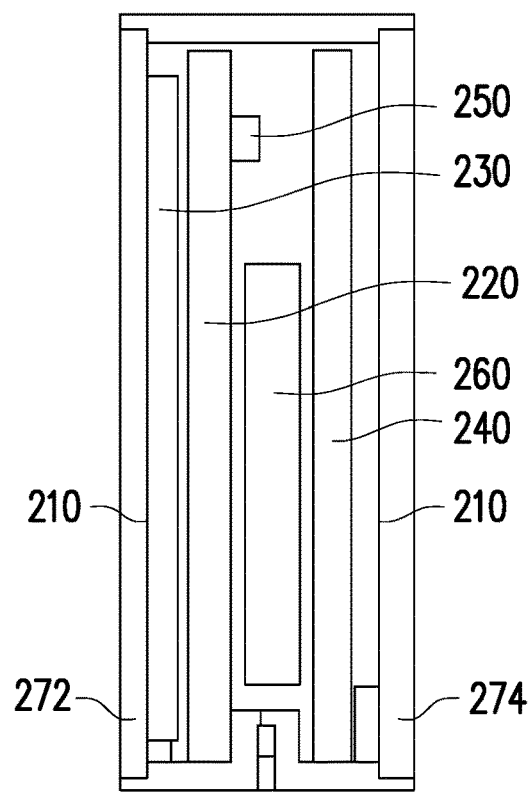
FIG. 7A illustrates a side perspective view of a gaming card in an embodiment of the invention.
Figure 7B:
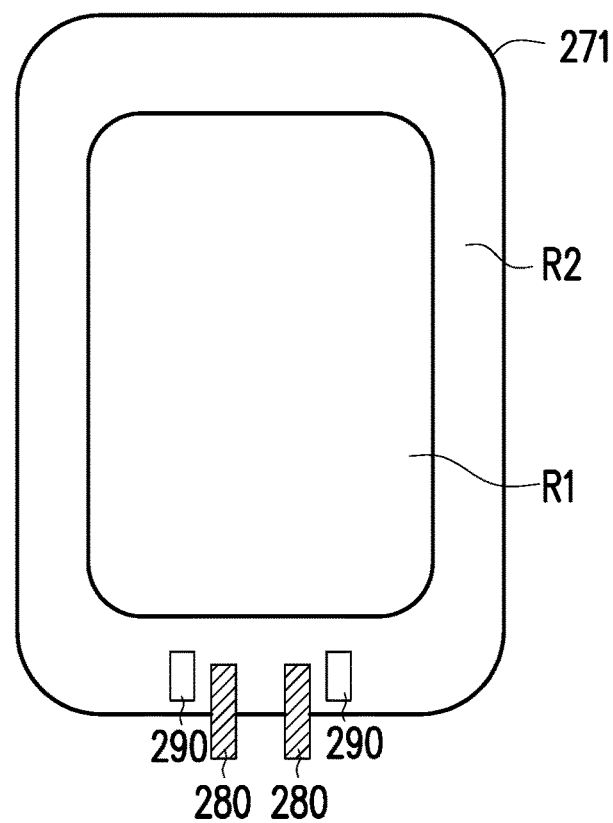
FIG. 7B illustrates a front view of a gaming card in an embodiment of the invention.

FIG. 7A illustrates a side perspective view of a gaming card in an embodiment of the invention; FIG. 7B illustrates a front view of a gaming card in an embodiment of the invention.

With reference to FIG. 7A, the recognition code 210 is printed on a surface of the second transparent dark color based layer 2721 of the front surface layer 272 facing the accommodating space, and the recognition code 210 is also printed on a surface of the first transparent dark color based layer 2741 of the back surface layer 274 facing the accommodating space. In some embodiments, starting from one side of the front surface layer 272, the display panel 230, the second communication module 220, the battery 260 and the control circuit 240 are disposed in the accommodating space in that sequence. The prompt element 250 is disposed above the battery 260 in the space between the second communication module 220 and the control circuit 240. In this way, all the elements of the gaming card 200 may be well placed in the accommodating space of the outer casing 270.

With reference to FIG. 7B, in some embodiments, a charging interface 280 is, for example, exposed outside on the lateral shell 271, coupled to the control circuit 240, and configured to charge the battery 260. In particular, in some embodiments, in correspondence to the charging interface 280, an alignment magnet 290 is further disposed on the lateral shell 271 and configured to ensure that the charging interface 280 can maintain a correct connection direction when charging.

In the foregoing embodiments, the gaming system 10 includes the processor 110, the first communication module 120, the display 130, the image capturing device 140, the invisible light source 150 and the gaming cards 200. Nonetheless, in some embodiments, the gaming system 10 only includes the processor 110 and the gaming cards 200, and runs the game together other elements like the first communication module 120, the display 130, the image capturing device 140, the invisible light source 150, etc. In other words, the gaming system 10 including the processor 110 and the gaming cards 200 can run the game together the existing elements like the first communication module 120, the display 130, the image capturing device 140, the invisible light source 150, etc.

In some embodiments, the gaming system 10 is applicable to, for example, the multiplayer online game. Since each player does not get in touch with all the cards in the multiplayer card game, a gaming card quantity of the gaming cards 200 may be less than a card quantity of a deck of cards. For instance, since a mahjong set includes a total of 144 mahjong tiles, 44 tiles are sufficient as the gaming card quantity of the gaming cards 200 when the gaming system 10 is used by one layer, and 76 tiles are sufficient as the gaming card quantity of the gaming cards 200 when the gaming system 10 is used by two layers. The tiles that will not be touched by the user during the game may be displayed by the display 130 as a replacement to the physical gaming cards 200. As another example, a deck of gaming cards includes 52 cards (e.g., 13 cards for each of the four suits) or 54 cards, the gaming card quantity of the gaming cards 200 may be less than 52 since not all 52 of the cards will be touch by one player who uses the gaming system 10 to play the poker game.

How each element in the gaming system 10 cooperates with each other to run the game will be described with reference to the embodiments as follows.

When the game starts, the processor 110 generates the correspondence between the gaming cards 200 and the card faces so as to determine the card faces corresponding to the gaming cards 200 in this round of the game. During the game, the processor 110 obtains the recognition code images of the gaming cards 200 in the recognition areas 131 to 135 through the image capturing device 140, and recognizes the recognition codes 210 in the recognition code images to generate a recognition result. According to the recognition result and the correspondence between the gaming cards 200 and the card faces, the processor 110 can learn of the game operation of the user during the game. In this way, the processor 110 can generate first game data according to the game operation of the user during the game, and generate a first game screen to be displayed by the display 130 according to the first game data.

In addition, in the multiplayer online game, the processor 110 may also receive second game data from another gaming system, and the processor 110 may also generate second game screen to be displayed by the display 130 according to the second game data.

In some embodiments, the gaming system 10 has one player and includes 44 gaming cards 200, and the user may use the gaming system 10 to play a single player game. Before the game starts, the user may place 7 gaming cards 200 in each of the recognition areas 131 to 134, and place 16 gaming cards 200 in the recognition area 135. When the game starts, the processor 110 randomly generates 44 card faces corresponding to 44 recognition codes of the 44 gaming cards 200 to obtain the correspondence, and this correspondence determines the card faces corresponding to the gaming cards 200 in this round of the game.

During the game, the processor 110 obtains the recognition code images of the gaming cards 200 in the recognition areas 131 to 135 through the image capturing device 140, and recognizes the recognition codes 210 in the recognition code images to generate a recognition result. According to the recognition result and the correspondence, the processor 110 can learn of the game operation of the user during the game. For instance, the processor 110 can learn of which gaming card 200 is added to or removed from which of the recognition areas 131 to 135, so as to learn that the game operation of the user is drawing, playing or "Chow".

The processor 110 can generate the first game data according to the game operation of the user during the game, and generate the first game screen to be displayed by the display 130 according to the first game data. For instance, after learning the game operation of the user, the processor 110 can generate the first game data according to the game operation of the user together with the game rule. In addition, according to the game operation of the user, the processor 110 may further calculate the game operation of the other players by using, for example, an artificial intelligence technology, so as to further generate the subsequent game screen to be displayed by the display 130.

In some embodiments, the gaming system 10 has one player and includes 44 gaming cards 200, and the user may use the gaming system 10 to play the multiplayer online game with three other players. Before the game starts, the user may place 7 gaming cards 200 in each of the recognition areas 131 to 134, and place 16 gaming cards 200 in the recognition area 135. When the game starts, the processor 110 communicates with other gaming systems through the first communication module 120 to assign 44 card faces among 144 card faces in the mahjong set to the user of the gaming system 10, and randomly generates the correspondence between the 44 recognition codes 210 of the 44 gaming cards 200 of the gaming system 10 and the assigned 44 card faces in this round of the game.

Similarly, during the game, the processor 110 obtains the recognition code images of the gaming cards 200 in the recognition areas 131 to 135 through the image capturing device 140, recognizes the recognition codes 210 in the recognition code images to generate a recognition result, and learns of the game operation of the user during the game according to the recognition result and the correspondence. The processor 110 can generate the first game data according to the game operation of the user during the game, generate the first game screen to be displayed by the display 130 according to the first game data, and send the first game data to another gaming system. In addition, during the game, the processor 110 also receives the second game data from the other gaming systems through the first communication module 120, and generates the second game screen to be displayed by the display 130 according to the second game data.

For instance, after learning the card discarded by the user, the processor 110 can generate the first game data according to such game operation, and generate the first game screen according to the game data (e.g., the game screen that instructs the next player to move). Further, the processor 110 also sends the first game data to the other gaming systems to inform the other gaming system of the card discarded by the user. Similarly, the second game data can also inform the processor 110 of the cards discarded by the other players in the other gaming systems so the processor 110 can generate the second game screen regarding the cards discarded by the other players and display the same on the display 130.

In some embodiments, during the game, the touch element of the display 130 can receive the external program touch command so the processor 110 can also generate the first game data according to the external program touch command.

In some embodiments, after generating the correspondence between the recognition codes 210 of the gaming cards 200 and the card faces, the processor 110 can send the card faces to the corresponding gaming cards 200. After receiving the card face, the gaming card 200 displays the received card face on the display panel 230.

In some embodiments, the processor 110 selects a time point for sending the card faces to the corresponding gaming cards 200 according to the game rule to avoid cheating. More specifically, the processor 110 sends the card faces to the gaming cards 200 that the user has right to know the card faces according to the game rule. In some embodiments, the processor 110 will send the card faces to the corresponding gaming cards right after determining the correspondence, and the control circuit 240 of the gaming card 200 only displays the card face through the display panel 230 only after receiving the control signal.

Figure 8A:
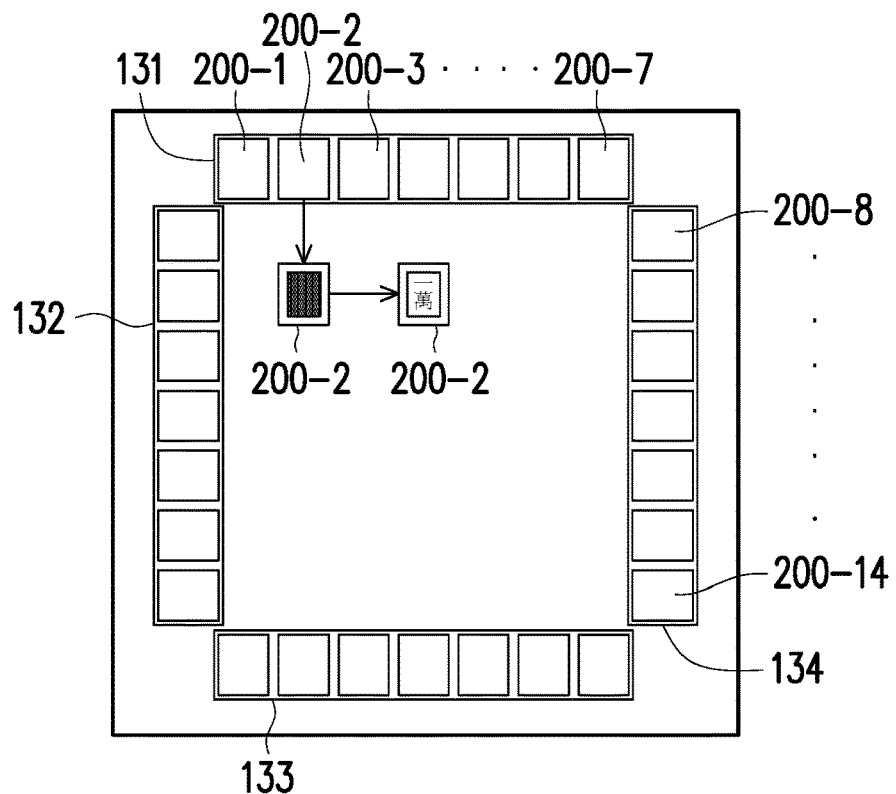
FIG. 8A and FIG. 8B illustrate schematic diagrams of a cheating prevention method in an embodiment of the invention.
Figure 8B:
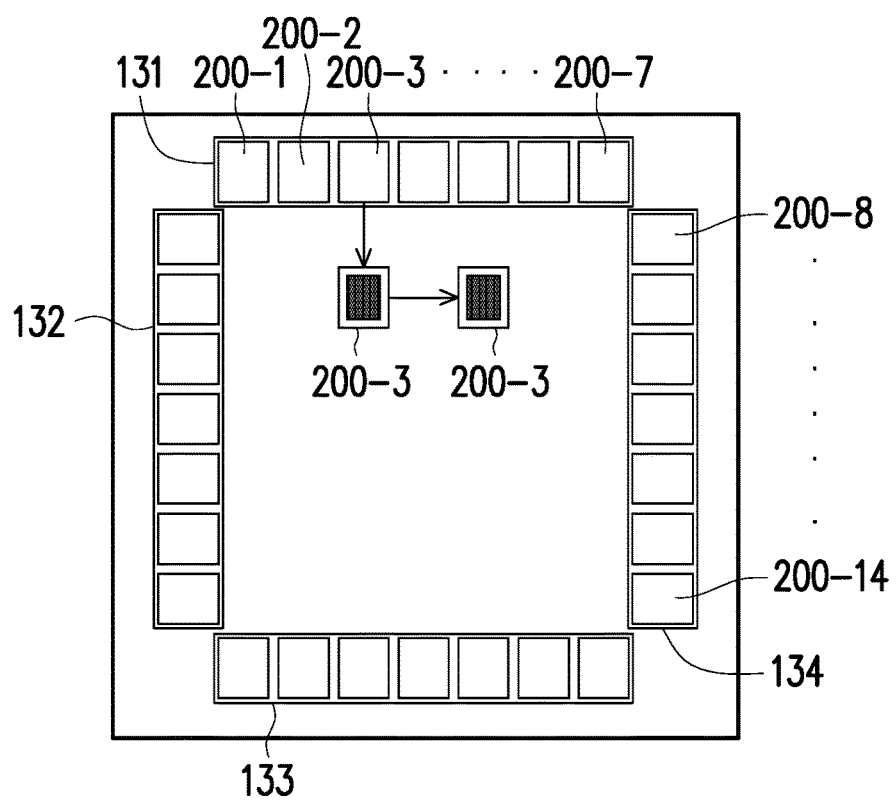

FIG. 8A and FIG. 8B illustrate schematic diagrams of a cheating prevention method in an embodiment of the invention.

With reference to FIG. 8A, card piles are placed in each of the recognition areas 131 to 134, in which gaming cards 200-1 to 200-7 are placed in the recognition area 131, for example, and gaming cards 200-8 to 200-14 are placed in the recognition area 134, for example. Based on the game rule of mahjong, the gaming cards that the user has the right known are only the gaming cards that the user should obtain at the time (i.e., the concerned gaming card).

Assuming that the user should obtain the gaming card 200-2 at the time, the processor 110 will send the control signal to the gaming card 200-2 so the gaming card 200-2 can send the prompt signal (e.g., flashing by the LED light) according to the control signal. In this embodiment, after sending the control signal to the gaming card 200-2, the processor 110 continues to recognize the recognition code 210 in the image captured by the image capturing device 140 until the recognition result indicates that the gaming card 200-2 already leaves the recognition area 131. In other words, the card face corresponding to the gaming card 200-2 is sent to the gaming card 200-2 only after the recognition code image of the gaming card 200-2 in the recognition area 131 disappears, and the display panel 230 of the gaming card 200-2 only turns from a black screen to the card face only after the gaming card 200-2 receives the card face.

With reference to FIG. 8B, in this embodiment, if the user obtains the gaming card 200-3 instead of the gaming card 200-2 when the user should really obtain the gaming card 200-2, because the processor 110 has not send the card face of the gaming card 200-3 to the gaming card 200-3 yet, the display panel 230 of the gaming card 200-3 is unable to display the card face but maintained at the black screen.

In this way, since only the gaming card 200-2 that the user has the right to know displays the card face, the user may be prevented from cheating the game.

Figure 9:
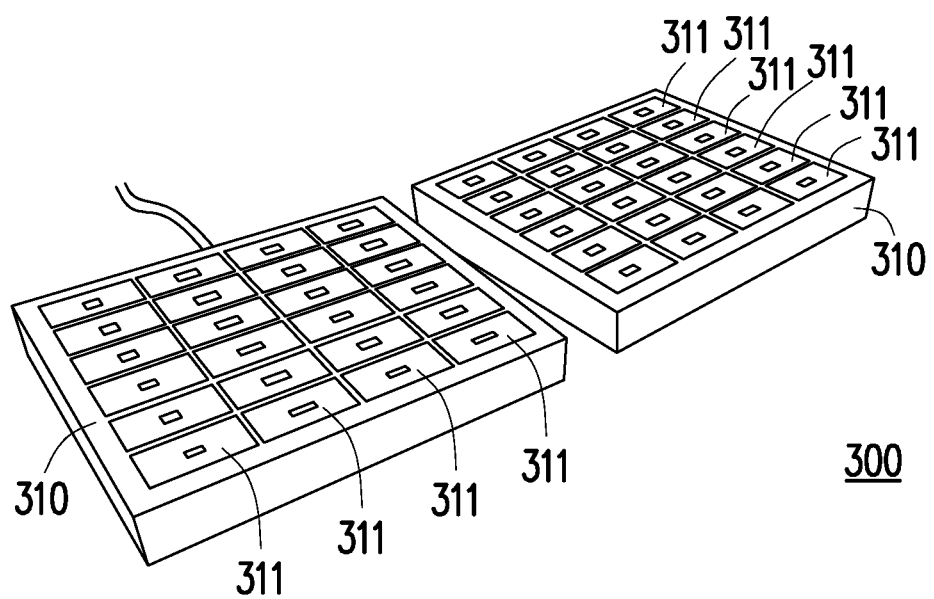
FIG. 9 illustrates a schematic diagram of a charging device in an embodiment of the invention.

FIG. 9 illustrates a schematic diagram of a charging device in an embodiment of the invention.

With reference to FIG. 9, in some embodiments, the gaming system 10 further includes a charging device 300. The charging device 300 includes a plurality of charging slots 311 corresponding to the gaming cards 200. Each of the charging slots 311 can accommodate one of the gaming cards 200. When one gaming card 200 is placed in the charging slot 311, the charging slot 311 can charge that gaming card 200. In some embodiments, each of the charging slots 311 is disposed corresponding to the charging interface 280 and of the alignment magnet 290 of the gaming card 200 to ensure that the gaming card 200 can be correctly charged after being inserted to the charging slot 311.

In this embodiment, the charging device 300 is composed of two charging stands 310, wherein each of the charging stands 310 includes the charging slots 311. However, the number of the charging stands 310 is not particularly limited by the invention. Further, the invention does not limit the number of the charging slots 311 either, which may be changed by persons with ordinary skill in the art based on actual requirements.

In summary, the gaming system proposed by the embodiments of the invention can allow the user to interact with the physical cards in the single or multiplayer card games, and can provide good user experience with both convenience and entertainment taken into consideration. In some embodiments, with the specially designed signal transmission mechanism, the gaming system can prevent cheating and maintain gaming quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A gaming system, comprising:
   a plurality of gaming cards, each of the gaming cards having a recognition code, wherein the recognition code is printed on an outer casing of each of the gaming card by using an invisible ink and the recognition code is invisible under a visible light; and
   a processor, configured to:
   generate a correspondence between the recognition codes of the gaming cards and a plurality of card faces;
   obtain a recognition code image of the gaming card placed in a recognition area by an image capturing device capable of capturing the invisible ink;
   recognize the recognition code image, and obtain a recognition result;
   generate first game data according to the recognition result and the correspondence; and
   generate a first game screen according to the first game data,
   wherein each of the gaming cards is wirelessly coupled to the processor, wherein each of the gaming cards has a display panel, and the processor is configured to transmit the card faces to the gaming cards according to the correspondence,
   wherein when the gaming card does not receive a corresponding card face, the display panel of the gaming card is a black screen.

2. The gaming system according to claim 1, further comprising:
   a display, coupled to the processor, and configured to display the first game screen, wherein the display comprises the recognition area.

3. The gaming system according to claim 2, wherein the display comprises a touch element configured to receive an external program touch command.

4. The gaming system according to claim 1, wherein the processor generates a first correspondence between the recognition codes of the gaming cards and the plurality of card faces in a first-round game.

5. The gaming system according to claim 4, wherein the processor generates a second correspondence between the recognition codes of the gaming cards and the plurality of card faces in a second-round game, wherein the first correspondence is different from the second correspondence.

6. The gaming system according to claim 1, further comprising:
   a first communication module, coupled to the processor;
   wherein the first communication module is configured to receive second game data from another gaming system, and the processor is configured to generate a second game screen according to the second game data.

7. The gaming system according to claim 6, wherein the processor is configured to transmit the first game data to said another gaming system through the first communication module.

8. The gaming system according to claim 1, wherein the display panel corresponds to a first area of a surface of the gaming card, and the recognition code corresponds to a second area of the surface, wherein the first area does not overlap with the second area.

9. The gaming system according to claim 1, wherein each of the gaming cards further comprises:
   a second communication module, wirelessly coupled to the processor; and
   a control circuit, coupled to the second communication module and the display panel, and configured to receive the card face through the second communication module and display the card face on the display panel.

10. The gaming system according to claim 9, wherein each of the gaming cards further comprises:
    a prompt element, coupled to the control circuit, and configured to send a prompt signal according to a control signal, wherein the processor is configured to send the control signal to a concerned gaming card among the gaming cards according to the first game data.

11. The gaming system according to claim 10, wherein the concerned gaming card displays the card face of the concerned gaming card displays only after receiving the control signal and waiting until the recognition code image in the recognition area disappears.

12. The gaming system according to claim 1, further comprising:
an invisible light source, configured to emit an invisible light towards the recognition area, wherein the image capturing device is configured to capture the recognition code image of the gaming card formed by a reflected light of the invisible light.

13. The gaming system according to claim 1, further comprising:
a charging device, comprising a plurality of charging slots corresponding to the gaming cards, Original configured to accommodate and charge the gaming cards.

14. The gaming system according to claim 1, wherein the gaming cards are a plurality of mahjong tiles, and a gaming card quantity of the gaming cards is less than a mahjong tile quantity in a mahjong set.

15. The gaming system according to claim 1, wherein the gaming cards are a plurality of playing cards, and a gaming card quantity of the gaming cards is less than a playing card quantity in a deck of gaming cards.

16. The gaming system according to claim 1, wherein each of the gaming cards comprises:
a back surface layer;
a front surface layer, disposed above the back surface layer and having a hollow area;
a transparent window, housed in the hollow area; and
a lateral shell, disposed between the back surface layer and the front surface layer to form an accommodating space.

17. The gaming system according to claim 16, wherein the back surface layer has a first transparent dark color based layer.

18. The gaming system according to claim 17, wherein the back surface layer has a first recognition code layer printed on the first transparent dark color based layer and located between the first transparent dark color based layer and the front surface layer.

19. The gaming system according to claim 18, wherein the back surface layer has a first shielding layer disposed on the first recognition code layer and located between the first recognition code layer and the front surface layer.

20. The gaming system according to claim 16, wherein each of the gaming cards further comprises:
a control circuit, disposed in the accommodating space.

21. The gaming system according to claim 20, wherein each of the gaming cards further comprises:
a communication module, disposed in the accommodating space, and electrically coupled to the control circuit.

22. The gaming system according to claim 20, wherein each of the gaming cards further comprises:
a charging interface, exposed outside on the lateral shell, and electrically coupled to the control circuit.

23. The gaming system according to claim 22, wherein each of the gaming cards further comprises:
an alignment magnet, disposed on the lateral shell corresponding to the charging interface.

24. The gaming system according to claim 20, wherein each of the gaming cards further comprises:
a light-emitting prompt element, disposed in the accommodating space, and electrically coupled to the control circuit.

25. The gaming system according to claim 24, wherein each of the gaming cards further comprises:
a light guiding layer, disposed between the back surface layer and the light-emitting prompt element.

26. The gaming system according to claim 20, wherein:
the display panel corresponds to the transparent window, disposed in the accommodating space, and electrically coupled to the control circuit.

27. The gaming system according to claim 16, wherein the front surface layer has a second transparent dark color based layer.

28. The gaming system according to claim 27, wherein the front surface layer has a second recognition code layer printed on the second transparent dark color based layer, surrounding the hollow area, and located between the second transparent dark color based layer and the back surface layer.

29. The gaming system according to claim 28, wherein the front surface layer has a second shielding layer disposed on the second recognition code layer, surrounding the hollow area, and located between the second recognition code layer and the back surface layer.

30. A gaming table, comprising:
a plurality of gaming cards, each of the gaming cards having a recognition code, wherein the recognition code is printed on an outer casing of each of the gaming card by using an invisible ink and the recognition code is invisible under a visible light;
a display, comprising a recognition area, and configured to display a first game screen;
an invisible light source, configured to emit an invisible light towards the recognition area;
an image capturing device, configured to capture at least one recognition code image of at least one of the gaming cards formed by a reflected light of the invisible light; and
a processor, coupled to the display, the invisible light source and the image capturing device, and configured to:
generate a correspondence between a plurality of recognition codes of the gaming cards and a plurality of card faces;
obtain a recognition code image of the gaming card placed in the recognition area by the image capturing device capable of capturing the invisible ink;
recognize the recognition code image of the gaming card placed in the recognition area, and obtain a recognition result;
generate first game data according to the recognition result and the correspondence; and
generate the first game screen according to the first game data,
wherein each of the gaming cards is wirelessly coupled to the processor, wherein each of the gaming cards has a display panel, and the processor is configured to transmit the card faces to the gaming cards according to the correspondence,
wherein when the gaming card does not receive a corresponding card face, the display panel of the gaming card is a black screen.

31. The gaming table according to claim 30, further comprising:
a communication module, electrically coupled to the processor, and configured to wirelessly connect with the gaming cards, wherein the processor transmits the card faces to the gaming cards according to the correspondence through the communication module.

32. The gaming table according to claim 30, further comprising: a sound receiver element, electrically coupled to the processor, and configured to receive a game operation voice command.

33. The gaming table according to claim 30, further comprising: a touch element, electrically coupled to the processor, and configured to receive an external program touch command.

* * * * *